United States Patent Office 3,119,858
Patented Jan. 28, 1964

3,119,858
IODINATED ESTERS OF SUBSTITUTED BENZOIC ACIDS AND PREPARATION THEREOF
Aubrey A. Larsen, Schodack Center, N.Y., assignor to Sterling Drug Inc., New York, N.Y., a corporation of Delaware
No Drawing. Filed Apr. 17, 1957, Ser. No. 653,289
11 Claims. (Cl. 260—471)

This invention relates to iodinated esters of substituted benzoic acids, and in particular it is concerned with hydroxyalkyl esters of 3-acylamido- or 3,5-diacylamido-2,4,6-triiodobenzoic acids having the formula

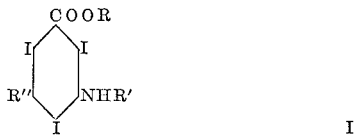

I wherein R is a lower-alkyl group having at least two carbon atoms and substituted by from one to three hydroxy groups, said hydroxy groups being on different carbon atoms and at least two carbon atoms removed from the carboxy group, R' is a lower-alkanoyl or hydroxy-lower-alkanoyl radical, and R'' is a hydrogen atom or an amino, lower-alkanoylamino or hydroxy-lower-alkanoylamino radical. The invention also relates to the process for preparing these compounds.

My new compounds are useful as X-ray contrast agents and are particularly valuable for visualizing the bronchial tree (bronchography), and for hepatolienography (visualization of the liver and spleen). For bronchography these compounds can be introduced into the lungs either as a finely divided dust or in an aqueous suspension prepared by the aid of emulsifying agents such as carboxymethylcellulose, polyvinylpyrrolidone, dextran and the like, for the purpose of delineating the morphology of the bronchial tree.

For hepatolienography the compounds are administered intravenously in the form of an aqueous suspension of very finely divided particles.

The ethyl ester of 3-acetamido-2,4,6-triiodobenzoic acid is known. It has an oral toxicity in mice ($LD_{50}$) of 7–8 grams per kilogram of body weight, and manifestations of systemic intoxication were observed at doses as low as 5 g./kg. as follows: intense hyperexcitability, tonic-clonic convulsions, salivation and respiratory depression. This compound cannot safely be used as a bronchographic or hepatolienographic agent because of the large quantities of material which must be used in the procedures. Surprisingly, it has been found that the presence of hydroxy groups in the alkyl ester moiety markedly decreases the toxicity. The compounds of the invention possess oral $LD_{50}$ values greater than 12 g./kg. and at this dose level exhibit no evidence of systemic toxicity.

The hydroxyalkyl esters of the present invention are superior to the corresponding alkyl esters for the purpose of bronchography in that a lesser quantity of emulsifying agent or detergent is needed to prepare stable aqueous suspensions, thereby minimizing any tendency for the suspension to produce alveolar flooding (chemical pneumonia) when instilled into the bronchi.

In the above general formula I, R represents a lower-alkyl group, straight or branched, having from two to about six carbon atoms and substituted by from one to three hydroxy groups, said hydroxy groups being on different carbon atoms and at least two carbon atoms removed from the carboxy group; in other words, the carbon atom adjacent to the carboxyl group is always unsubstituted. This restriction of the placement of the hydroxy groups eliminates the hemiacetal type derivatives which would result from having a hydroxy group on the carbon atom attached to the carboxy group. The group R thus includes such groups as 2-hydroxyethyl, 3-hydroxypropyl, 2,3 - dihydroxypropyl, 2,2' - dihydroxyisopropyl, 4-hydroxybutyl, 2,3,4 - trihydroxybutyl, 5-hydroxypentyl, 6-hydroxyhexyl, and the like.

In the above general formula I, R' represents a lower-alkanoyl or hydroxy-lower-alkanoyl radical. The lower-alkanoyl radicals are acyl radicals derived from lower fatty acids having from one to about eight carbon atoms; thus, lower-alkanoyl includes such groups as formyl, acetyl, propionyl, butyryl, isobutyryl, valeryl, isovaleryl, caproyl, isocaproyl, heptanoyl and octanoyl. The hydroxy-lower-alkanoyl radicals are the same radicals substituted by a hydroxy group.

In the above general formula I, R'' represents a hydrogen atom or an amino, lower-alkanoylamino or hydroxy-lower-alkanoylamino radical. The lower-alkanoyl and hydroxy-lower-alkanoyl radicals of R'' are the same as defined and exemplified above for R', although in any given compound the alkanoyl groups of R' and R'' can be the same or different.

The compounds of the invention are prepared by heating an alkali metal salt of an acid having the formula

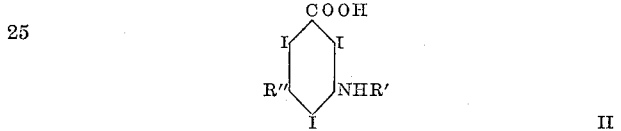

II with the appropriate halohydrin or epoxide. The halohydrin is of the formula XR where X is halogen, preferably chlorine, bromine or iodine. The epoxide is one which yields the group R upon cleavage of the oxide ring by addition of the carboxyl group of the acid II.

The reaction between the alkali metal salt of the iodinated acid II and a halohydrin is carried out by heating said salt and said halohydrin in approximately equimolar quantities in a reaction medium, inert under the conditions of the reaction, at a temperature between 50° C. and 150° C. A matathesis reaction takes place in which an ester is produced between the acid and hydroxyalkyl moieties, an alkali metal halide being formed as a byproduct.

The reaction between the alkali metal salt of the acid II and an epoxide is carried out by contacting said salt and at least an equimolar quantity of said epoxide in an inert reaction medium. The reaction takes place without application of heat. It is necessary only that a small fraction of the acid II be in the form of its alkali metal salt since the alkalinity of the mixture is not altered during the course of the reaction as in the case of the halohydrin which in effect brings about a neutralization. The reaction with the epoxide is an addition reaction involving the opening of the epoxide ring.

The intermediate acids II are a known class of compounds; Larsen et al. J. Am. Chem. Soc. 78, 3210–6 (1956), and Wallingford U.S. Patent 2,611,786.

The structure of the compounds of the invention was established by the mode of synthesis and by chemical analysis. The conversion of acidic to neutral substances indicated that reaction had taken place at the site of the carboxyl group.

The following examples will further illustrate the invention without limiting the latter thereby.

EXAMPLE 1

2-Hydroxyethyl 3,5-Diacetamido-2,4,6-Triiodobenzoate

[I; R is $CH_2CH_2OH$, R' is $COCH_3$, R'' is $CH_3CONH$]

A mixture of 127.2 g. (0.20 mole) of sodium 3,5-diacetamido-2,4,6-triiodobenzoate and 30 g. (17 ml., 0.24 mole) of ethylene bromohydrin in 350 ml. of dimethylformamide was heated on a steam bath for six and onequarter hours. The mixture was diluted to 800 ml. with hot water and filtered while hot. Upon cooling the filtrate a solid separated which was collected by filtration, stirred with 600 ml. of dilute sodium hydroxide solution and again collected by filtration. The solid product was washed with water and dried at 40° C. for seventy-two hours, giving 103 g. of 2-hydroxyethyl 3,5-diacetamido-2,4,6-triiodobenzoate, M.P. 265–265.5° C. (dec.)(corr.).

*Analysis.*—Calcd. for $C_{13}H_{13}I_3N_2O_5$: C, 23.72; H, 1.77; I, 57.9. Found: C, 23.73; H, 2.00; I, 58.0.

By replacement of the ethylene bromohydrin in the preceding preparation by a molar equivalent amount of 2,2,2-tris(hydroxymethyl)ethyl bromide $$[(HOCH_2)_3CCH_2Br]$$

1-methyl-2-hydroxyethyl chloride, 4-hydroxybutyl bromide, or 6-hydroxyhexyl bromide, there can be obtained, respectively, 2,2,2-tris(hydroxymethyl)ethyl 3,5-diacetamido-2,4,6-triiodobenzoate [I; R is $CH_2C(CH_2OH)_3$, R' is $COCH_3$, R'' is $CH_3CONH$], 1-methyl-2-hydroxyethyl 3,5-diacetamido-2,4,6-triiodobenzoate [I; R is $$CH(CH_3)CH_2OH$$

R' is $COCH_3$, R'' is $CH_3CONH$], 4-hydroxybutyl 3,5-diacetamido-2,4,6-triiodobenzoate [I; R is $$CH_2(CH_2)_2CH_2OH$$

R' is $COCH_3$, R'' is $CH_3CONH$], or 6-hydroxyhexyl 3,5-diacetamido-2,4,6-triiodobenzoate [I; R is $$CH_2(CH_2)_4CH_2OH$$

R' is $COCH_3$, R'' is $CH_3CONH$].

By replacement of the sodium 3,5-diacetamido-2,4,6-triiodobenzoate in the preceding preparation by a molar equivalent amount of sodium 3-acetamido-5-formamido-2,4,6-triiodobenzoate, sodium 3,5-dipropionamido-2,4,6-triiodobenzoate, sodium 3-acetamido-5-octanoylamino-2,4,6-triiodobenzoate, sodium 3,5-dicaproylamino-2,4,6-triiodobenzoate, sodium 3-acetamido-5-hydroxyacetamido-2,4,6-triiodobenzoate, sodium 3-formamido-2,4,6-triiodobenzoate, sodium 3-acetamido-5-amino-2,4,6-triiodobenzoate, or sodium 3-caproylamino-2,4,6-triiodobenzoate, there can be obtained, respectively, 2-hydroxyethyl 3-acetamido-5-formamido-2,4,6-triiodobenzoate [I; R is $CH_2CH_2OH$, R' is $COCH_3$, R'' is $HCONH$], 2-hydroxyethyl 3,5-dipropionamido-2,4,6-triiodobenzoate [I; R is $CH_2CH_2OH$, R' is $COCH_2CH_3$, R'' is $CH_3CH_2CONH$], 2-hydroxyethyl 3-acetamido-5-octanoylamino-2,4,6-triiodobenzoate [I; R is $CH_2CH_2OH$, R' is $COCH_3$, R'' is $CH_3(CH_2)_6CONH$], 2-hydroxyethyl 3,5-dicaproylamino-2,4,6-triiodobenzoate [I; R is $CH_2CH_2OH$, R' is $CO(CH_2)_4CH_3$, R'' is $$CH_3(CH_2)_4CONH]$$

2-hydroxyethyl 3-acetamido-5-hydroxyacetamido-2,4,6-triiodobenzoate [I; R is $CH_2CH_2OH$, R' is $COCH_3$, R'' is $HOCH_2CONH$], 2-hydroxyethyl 3-formamido-2,4,6-triiodobenzoate [I; R is $CH_2CH_2OH$, R' is $COH$, R'' is H], 2-hydroxyethyl 3-acetamido-5-amino-2,4,6-triiodobenzoate [I; R is $CH_2CH_2OH$, R' is $COCH_3$, R'' is $NH_2$], or 2-hydroxyethyl 3-caproylamino-2,4,6-triiodobenzoate [I; R is $CH_2CH_2OH$, R' is $CO(CH_2)_4CH_3$, R'' is H].

EXAMPLE 2

*2,3-Dihydroxypropyl 3,5-Diacetamido-2,4,6-Triiodobenzoate*

[I; R is $CH_2CH(OH)CH_2OH$, R' is $COCH_3$, R'' is $CH_3CONH$]

A mixture of 127.2 g. (0.20 mole) of sodium 3,5-diacetamido-2,4,6-triiodobenzoate and 20 ml. of 2,3-dihydroxypropyl chloride in 150 ml. of dimethylformamide was refluxed for eight hours. The mixture was filtered and the filtrate was concentrated in vacuo. The residue was treated repeatedly with n-butanol and concentrated to remove water. The dried residue was taken up in methanol, and the solution was filtered and concentrated to a small volume. The product was collected by filtration, washed with cold methanol and acetone, recrystallized from methanol and dried at 100° C. for four days, giving 2,3-dihydroxypropyl 3,5-diacetamido-2,4,6-triiodobenzoate, M.P. 239–248.5° C. (dec.)(corr.).

*Analysis.*—Calcd. for $C_{14}H_{15}I_3N_2O_6$: C, 24.44; H, 2.20; N, 4.07; O, 13.95; I, 55.3. Found: C, 24.77; H, 2.38; N, 4.07; O, 13.60; I, 55.0.

EXAMPLE 3

*2,3-Dihydroxypropyl 3-Acetamido-2,4,6-Triiodobenzoate*

[I; R is $CH_2CH(OH)CH_2OH$, R' is $COCH_3$, R'' is H]

A mixture of 53 g. (0.091 mole) of sodium 3-acetamido-2,4,6-triiodobenzoate and 10 ml. of 2,3-dihydroxypropyl chloride in 100 ml. of dimethylformamide was refluxed (130–135° C.) for six hours. The reaction mixture was filtered, the filtrate concentrated in vacuo, and water was added to the residue. The solid product was collected by filtration, air dried, and recrystallized from isopropyl alcohol containing a small amount of methanol, giving 42 g., M.P. 165–200° C. The product was further purified by stirring with dilute sodium hydroxide, filtering, washing with water and recrystallizing from a methanol-isopropyl alcohol mixture, giving 35 g. of 2,3-dihydroxypropyl 3-acetamido-2,4,6-triiodobenzoate, M.P. 162–166° C. (corr.).

*Analysis.*—Calcd. for $C_{12}H_{12}I_3NO_5$: C, 22.84; H, 1.92; I, 60.3. Found: C, 22.61; H, 1.91; I, 60.8.

EXAMPLE 4

*2-Hydroxyethyl 3-Acetamido-5-Hydroxyacetamido-2,4,6-Triiodobenzoate*

[I; R is $CH_2CH_2OH$, R' is $COCH_3$, R'' is $HOCH_2CONH$]

3-Acetamido-5-hydroxyacetamido-2,4,6-triiodobenzoic acid (22.5 g., 0.036 mole), 1.9 g. (0.018 mole) of sodium carbonate and 2.8 ml. (0.04 mole) of ethylene bromohydrin were added to 40 ml. of dimethylformamide, and the mixture was heated for fourteen hours on a steam bath. The reaction mixture was concentrated to dryness in vacuo, and 150 ml. of water and sufficient 10% sodium hydroxide solution to make the mixture weakly basic were added. The mixture was heated to boiling, activated charcoal was added for decolorizing purposes, and the mixture was filtered. From the filtrate upon cooling there separated 19 g. of product which when recrystallized from 240 ml. of water gave 16 g. of 2-hydroxyethyl 3-acetamido-5-hydroxyacetamido-2,4,6-triiodobenzoate, M.P. 248° C. (dec.)(corr.).

*Analysis.*—Calcd. for $C_{13}H_{13}I_3N_2O_6$: C, 23.10; H, 1.93; N, 4.16; I, 56.5. Found: C, 23.15; H, 2.19; N, 4.10; I, 56.3.

EXAMPLE 5

*2-Hydroxyethyl 3-Acetamido-2,4,6-Triiodobenzoate*

[I; R is $CH_2CH_2OH$, R' is $COCH_3$, R'' is H]

A mixture of 15 g. (0.026 mole) of sodium 3-acetamido 2,4,6-triiodobenzoate and 4.1 g. (0.032 mole) of ethylene bromohydrin in 45 ml. of dimethylformamide was heated on a steam bath for seven and one-half hours. The reaction mixture was concentrated in vacuo, and the residue was recrystallized first from 50 ml. of isopropyl alcohol and then from methyl isobutyl ketone, giving 2-hydroxyethyl 3-acetamido-2,4,6-triiodobenzoate, M.P. 184–186° C. (corr.).

*Analysis.*—Calcd. for $C_{11}H_{10}I_3NO_4$: C, 21.98; H, 1.68; I, 6.34. Found: C, 22.25; H, 2.08; I, 63.3.

EXAMPLE 6

*2-Hydroxypropyl 3,5-Diacetamido-2,4,6-Triiodobenzoate*

[I; R is $CH_2CH(OH)CH_3$, R' is $COOH_3$, R'' is $CH_3CONH$]

To 127.2 g. (0.20 mole) of sodium 3,5-diacetamido-2,4,6-triiodobenzoate in 500 ml. of water was added 15 ml. of concentrated hydrochloric acid (sufficient to liberate 90% of the free acid), and then was added 30 g. of 1,2-propylene oxide. The mixture was stirred at room temperature for twenty hours, and the solid product was collected by filtration, washed with water, recrystallized from aqueous dimethylformamide and dried, giving 35.7 g. of 2-hydroxypropyl 3,5-diacetamido-2,4,6-triiodobenzoate, M.P. 264.5° C. (dec.) (corr.).

*Analysis.*—Calcd. for $C_{14}H_{15}I_3N_2O_5$: N, 4.17; I, 56.6. Found: N, 4.12; I, 55.9.

By replacement of the propylene oxide in the preceeding preparation by a molar equivalent amount of ethylene oxide or 2-methyl-1,2-propylene oxide, there can be obtained, respectively, 2-hydroxyethyl 3,5-diacetamido-2,4,6-triiodobenzoate [I; R is $CH_2CH_2OH$, R' is $COCH_3$, R'' is $CH_3CONH$], or 2-methyl-2-hydroxypropyl 3,5-diacetamido-2,4,6-triiodobenzoate [I; R is $$CH_2C(OH)(CH_3)_2$$

R' is $COCH_3$, R'' is $CH_3CONH$].

I claim:

1. A compound having the formula

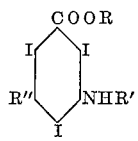

wherein R is a lower-alkyl group having at least two carbon atoms and substituted by from one to three hydroxy groups, said hydroxy groups being on different carbon atoms and at least two carbon atoms removed from the carboxy group, R' is a member of the group consisting of lower-alkanoyl and hydroxy-lower-alkanoyl radicals, and R'' is a member of the group consisting of hydrogen, amino, lower-alkanoylamino and hydroxy-lower-alkanoylamino radicals.

2. A compound having the formula

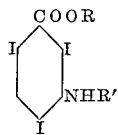

wherein R is a lower-alkyl group having at least two carbon atoms and substituted by from one to three hydroxy groups, said hydroxy groups being on different carbon atoms and at least two carbon atoms removed from the carboxy group, and R' is a lower-alkanoyl group.

3. A compound having the formula

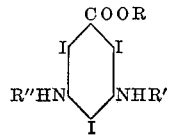

wherein R is a lower-alkyl group having at least two carbon atoms and substituted by from one to three hydroxy groups, said hydroxy groups being on different carbon atoms and at least two carbon atoms removed from the carboxy group, and R' and R'' are lower-alkanoyl groups.

4. A compound having the formula

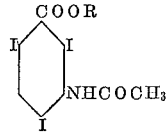

wherein R is a lower-alkyl group having at least two carbon atoms and susbtituted by from one to three hydroxy groups, said hydroxy groups being on different carbon atoms and at least two carbon atoms removed from the carboxy group.

5. A compound having the formula

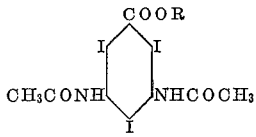

wherein R is a lower-alkyl group having at least two carbon atoms and substituted by from one to three hydroxy groups, said hydroxy groups being on different carbon atoms and at least two carbon atoms removed from the carboxy group.

6. 2-hydroxyethyl 3-acetamido-2-4,6-triiodobenzoate.

7. 2,3-dihydroxypropyl 3-acetamido-2,4,6-triiodobenzoate.

8. 2-hydroxyethyl 3,5-diacetamido-2,4,6-triiodobenzoate.

9. 2-hydroxypropyl 3,5-diacetamido-2,4,6-triiodobenzoate.

10. 2,3-dihydroxypropyl 3,5-diacetamido-2,4,6-triiodobenzoate.

11. 2-hydroxyethyl 3-acetamido-5-hydroxyacetamido-2,4,6-triiodobenzoate.

References Cited in the file of this patent

UNITED STATES PATENTS

| | | |
|---|---|---|
| 1,022,645 | Taub | Apr. 9, 1912 |
| 2,561,468 | Guest | July 24, 1951 |
| 2,611,786 | Wallingford | Sept. 23, 1952 |
| 2,776,241 | Priewe et al. | Jan. 1, 1957 |

OTHER REFERENCES

Larsen et al., J. Am. Chem. Soc., 78, 3210–6 (1956).